(12) United States Patent
Karlsson et al.

(10) Patent No.: US 9,019,825 B2
(45) Date of Patent: Apr. 28, 2015

(54) SCHEDULED GRANT HANDLING

(75) Inventors: Patrik Karlsson, Alta (SE); Joe Constantine, Stockholm (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 1288 days.

(21) Appl. No.: 12/300,513

(22) PCT Filed: May 17, 2006

(86) PCT No.: PCT/SE2006/050131
§ 371 (c)(1),
(2), (4) Date: Nov. 12, 2008

(87) PCT Pub. No.: WO2007/133135
PCT Pub. Date: Nov. 22, 2007

(65) Prior Publication Data
US 2009/0124257 A1    May 14, 2009

(51) Int. Cl.
*H04W 28/22* (2009.01)
*H04L 1/00* (2006.01)
(Continued)

(52) U.S. Cl.
CPC .............. *H04W 28/22* (2013.01); *H04L 1/0002* (2013.01); *H04L 1/0025* (2013.01); *H04W 52/146* (2013.01); *H04W 52/267* (2013.01); *H04W 52/286* (2013.01)

(58) Field of Classification Search
CPC ..... H04L 47/25; H04L 47/225; H04L 47/263; H04L 5/0064; H04L 1/0002; H04L 1/0025; H04W 28/22; H04W 52/267; H04W 52/286; H04W 52/146
USPC .............. 370/229, 230, 230.1, 232, 233, 234, 370/235, 241, 252, 253, 351, 389, 395.1, 370/395.4, 431, 437, 442, 443, 464, 465, 370/468, 395.2
See application file for complete search history.

(56) References Cited

U.S. PATENT DOCUMENTS 5,161,154 A    11/1992    Diaz et al.
5,488,609 A *   1/1996    Hluchyj et al. ............... 370/232
(Continued)

FOREIGN PATENT DOCUMENTS

| WO | 9826567 A1 | 6/1998 |
|----|------------|--------|
| WO | 2005055486 A2 | 6/2005 |
| WO | 2006030313 A2 | 3/2006 |

OTHER PUBLICATIONS

Office Action issued in corresponding Chinese Patent Application No. 200680054622.6 on Jul. 21, 2011, 3 pages.
(Continued)

*Primary Examiner* — Obaidul Huq
(74) *Attorney, Agent, or Firm* — Rothwell, Figg, Ernst & Manbeck, P.C.

(57) ABSTRACT

The present invention relates to a network node and a method in a radio communications network for providing a radio interface between the radio base station and a mobile terminal, provided to assign transmission rates to the mobile terminal to be used in an uplink packet data channel from the mobile terminal to the radio base station. A receiver is provided to receive at least a first rate request from the mobile terminal requesting increased transmission rate, a measurement device is provided to measure the utilised transmission rate for the packet data transmission from the mobile terminal to the radio base station, and a message transmitter is provided to send a new grant message to the mobile terminal repeating the first transmission rate, if the measured transmission rate is lower than a first specified fraction of the assigned first transmission rate.

28 Claims, 6 Drawing Sheets

(51) Int. Cl.
*H04W 52/14* (2009.01)
*H04W 52/26* (2009.01)
*H04W 52/28* (2009.01)

(56) References Cited

U.S. PATENT DOCUMENTS

| | | | |
|---|---|---|---|
| 6,408,005 B1* | 6/2002 | Fan et al. .................... | 370/412 |
| 2002/0093929 A1* | 7/2002 | Mangold et al. ............ | 370/336 |
| 2003/0045237 A1* | 3/2003 | Gardner et al. .............. | 455/63 |
| 2003/0219037 A1* | 11/2003 | Toskala et al. .............. | 370/496 |
| 2005/0025100 A1* | 2/2005 | Lee et al. .................... | 370/335 |
| 2005/0117519 A1 | 6/2005 | Kwak et al. | |
| 2006/0062146 A1* | 3/2006 | Sebire et al. ................ | 370/230 |
| 2006/0166673 A1* | 7/2006 | Vasudevan ................... | 455/439 |
| 2007/0177536 A1* | 8/2007 | Brueck et al. ............... | 370/328 |

OTHER PUBLICATIONS

Office Action issued in corresponding Chinese Patent Application No. 200680054622.6 on Oct. 18, 2010 with English translation, 11 pages.

Supplementary European Search Report issued in corresponding European Patent Application No. 06 73 3501 on Feb. 27, 2012, 5 pages.

Third Office Action issued by the State Intellectual Property Office of China in Patent Appln. No. 200680054622.6, dated May 9, 2014, 19 pages.

* cited by examiner

US 9,019,825 B2

SCHEDULED GRANT HANDLING

CROSS REFERENCE TO RELATED APPLICATION

This application is a 35 U.S.C. §371 National Phase Application from PCT/SE2006/050131, filed May 17, 2006, and designating the United States.

TECHNICAL FIELD

The present invention relates to the field of radio telecommunications. More specifically, the present invention relates to efficient transmission rate allocation to a user terminal in a telecommunications system.

BACKGROUND OF THE INVENTION

The present invention finds application particularly in third-generation networks of Wideband Code Division Multiple Access (WCDMA) type. However, the techniques may be applicable also in connection with other types of radio networks, such as GSM, CDMA etc.

In radio telecommunications networks a base station or a node B as it is named in WCDMA provides a radio, or air interface to a mobile user terminal, or user equipment. This radio interface is called the Uu interface in WCDMA. The node B is connected to a Radio Network Controller (RNC) which is the network element responsible for control of radio resources in the Universal Mobile Telephony Network (UMTS) Radio Access Network (UTRAN). The Node B and the RNC are connected through the Iub interface. The RNC is in turn connected to a Core Network (CN) which may comprise a number of different network nodes, such as MSC/VLR, SGSN etc.

In third-generation radio access networks increased transmission rates has been a primary goal and new protocols and techniques for achieving increased transmission rates has been developed. A High Speed Downlink Packet Access (HSDPA) protocol has been standardised in WCDMA release 5, and recently it has been complemented by a High Speed Uplink Packet Access (HSUPA) protocol in WCDMA release 6.

In HSUPA different user equipment is assigned different transmission rates, or Grants, ranging from 0 kbps up to 5.76 Mbps. That is, one user may have a larger Grant than another. To support the transmissions, hardware in Node B is allocated in hardware pools and hardware resources are allocated to a particular user to support the transmission rate required. The larger the transmission rates, the more hardware resources required, as well as air interference generated in the Uu interface, and load on the Iub link.

When an Enhanced Direct Channel (E-DCH) user, that is a user having a grant for HSUPA transmission, is in handover more than one cell receives the uplink data transmission from the user equipment. The data received from the different cells are combined in the RNC. However, if the cells belong to the same RBS it is possible, but not necessary, that the combining is performed at the RBS. For E-DCH the RBS will only relay the data to the RNC if the RBS has received the data correctly. Thus, the RNC is responsible to combine the data it receives from all RBSs and cells in the handover. One of the RBS nodes, most likely the node having the best radio characteristics, is a serving node and the other RBS nodes are non-serving nodes.

The serving node can, by sending absolute grants (AG) or relative grants (RG), adjust the scheduled transmission rate for the user equipment, that is, the serving RBS can both increase and decrease the scheduled rate, while the non-serving node can only send relative grants to reduce the transmission rate. There is no communication between the two RBS nodes, so the serving node does not have information relating to the particular capacity circumstances for the non-serving node.

SUMMARY

When a serving node decreases the rate for an enhanced uplink user, there is a risk that, for a number of reasons, the user is not able to receive the new grant message, such as poor downlink signal reception characteristics. This user will then continue to send with a higher transmission rate, and thus overusing its scheduled grant. This may become a problem in the radio base station since the radio base station may not be able to decode the received data, due to lack of resources for instance hardware.

An enhanced uplink user who is in handover, that is more than one cell is listening to the data transmissions, can be limited by a non-serving cell through a relative grant message. The user equipment may then send a rate request for increased rate to the serving node. Thus, there might be a mismatch between the rate the serving cell is willing to give to the user equipment and the rate the non-serving cell may sustain. This may cause problems relating to for instance oscillating transmission rate, as the serving node increases the rate while the non-serving node decreases it, bad utilisation of hardware, as well as increased interference, particularly in the non-serving cell.

It is an object of one aspect of the present invention to provide such apparatuses and methods that at least alleviate the above mentioned problems.

One object according to an aspect of the invention is to provide such apparatuses and methods that provide an efficient allocation of radio resources.

One object according to an aspect of the invention is to provide such apparatuses and methods that provide minimal transmission delays.

These objects among others are, according to a one aspect of the present invention, attained by a method for assigning transmission rates, for an uplink packet data channel, to a mobile terminal in a radio telecommunications network comprising a radio base station.

The method comprises the steps of receiving at least a first rate request from the mobile terminal at the radio base station, sending at least a first grant message to the mobile terminal assigning a first transmission rate for uplink packet data transmission, receiving at least a second rate request from the mobile terminal at the radio base station, measuring the utilised transmission rate for the packet data transmission from the mobile terminal to the radio base station, and sending a new grant message to the mobile terminal repeating the first transmission rate, if the measured transmission rate is lower than a first specified fraction of the assigned first transmission rate.

These objects among others are, according to a one aspect of the present invention, attained by a radio base station in a radio communications network for providing a radio interface between the radio base station and a mobile terminal, the radio base station being further provided to assign transmission rates to the mobile terminal to be used in an uplink packet data channel from the mobile terminal to the radio base station.

The radio base station comprises a receiver provided to receive at least a first rate request from the mobile terminal requesting increased transmission rate, a measurement device provided to measure the utilised transmission rate for the packet data transmission from the mobile terminal to the radio base station, and a message transmitter provided to send a new grant message to the mobile terminal repeating the first transmission rate, if the measured transmission rate is lower than a first specified fraction of the assigned first transmission rate.

By measuring the transmission rate utilised by a mobile terminal it is possible to determine if the terminal is utilising the assigned, or scheduled, transmission rate. If the terminal is not using its full potential rate, this can be due to many reasons. One such reason may be that the terminal is in handover and has been restricted by the non-serving node through a relative grant message.

Under such circumstances, the terminal, given that other requisites are fulfilled, such as that the terminal has data to transmit, will continue to send rate requests for increased rate to the serving node. If the serving node would send a new increased grant at this time, there would be a risk of oscillating rates as the non-serving cell reduces the rate and the serving cell increases it, or possibly increased interference as well as other negative impacts.

According to one variant of the present invention, the transmission rate is measured, and the previously sent transmission rate is repeated if the utilized transmission rate is below a threshold. Thus, if the mobile terminal did not "hear" the increased grant message, the terminal is given a new chance.

According to one variant of an aspect of the invention an effective scheduled rate based on measuring the utilised transmission rate is determined. The effective scheduled rate may be substantially equal to the utilised transmission rate. The transmission rate may for instance be estimated by reading the E-TFCI field received from the terminal. The measurement may according to one variant of the invention be performed by averaging over several Transmission Time Intervals (TTI).

Finally, a new grant message is sent to the mobile terminal assigning the effective scheduled rate for uplink packet data transmission when the first transmission rate has been repeated a specified number of times.

When the currently scheduled transmission rate has been repeatedly sent to the terminal, and the terminal has not been able to increase its utilised transmission rate above the threshold, that is a fraction of the current scheduled rate, such as 80%, it can be assumed that the terminal will not be able to utilise the scheduled rate.

By estimating the utilised transmission rate and sending a new grant to the terminal reducing the scheduled grant to substantially the measured utilised rate, resources, such as hardware resources, may be conserved in the serving node.

These objects among others are, according to a one aspect of the present invention, attained by a method for assigning transmission rates, for an uplink packet data channel, to a mobile terminal in a radio telecommunications network comprising a radio base station.

The method comprises the steps of sending a grant message to the mobile terminal assigning a first transmission rate for uplink packet data transmission over the uplink packet data channel, measuring the utilised transmission rate for the packet data transmission from the mobile terminal to the radio base station, and sending a new grant message repeating the first transmission rate if the utilised transmission rate is greater than the first transmission rate.

According to one variant of an aspect of the invention a new grant message is sent to the mobile terminal repeating the first transmission rate, if the measured transmission rate is greater than a second specified fraction of the assigned first transmission rate, wherein the second specified fraction is larger than the first specified fraction.

When a new grant is sent to the mobile terminal reducing the scheduled grant there is a slight risk that the terminal will not receive the message. This may for instance depend on temporary reduced radio characteristics, due to for instance fading. If the terminal does not receive the new reduced grant, the mobile terminal may continue to transmit with the higher transmission rate. Since the radio base station may have released hardware previously allocated to the mobile terminal for supporting the previous, higher transmission rate, there is a risk that the radio base station may not be able to decode the data transmission from the mobile terminal.

By repeating the new reduced grant, the mobile terminal may receive the repeated grant and thus adjust the transmission rate correctly.

When measuring, or estimating, the utilised transmission rate considerations need to be taken to arrive at a correct estimation. For instance, from the time the new reduced grant is sent from the radio base station, there will be a time interval before the mobile terminal has adjusted to the new reduced transmission rate. Another issue, which needs consideration, is that any retransmissions from the mobile terminal will be transmitted with the previous higher transmission rate, according to the WCDMA release 6 standard. Thus, the radio base station needs to consider aspects like these in the estimation of the utilised transmission rate accordingly.

According to one variant of an aspect of the invention the second specified fraction is larger than 1.

According to one variant of an aspect of the invention the new grant message is sent to the mobile terminal without first receiving a rate request from the mobile terminal.

If the radio base station, or rather a scheduling process in the radio base station, finds that a mobile terminal is overusing its scheduled rate according to the above, a previously sent grant may be repeated without first receiving a rate request, since it is assumed that the mobile terminal did not "hear" the original grant message reducing the rate.

According to one variant of an aspect of the invention a rate request message from the mobile terminal is ignored if the utilised transmission rate is greater than the first fraction of the transmission rate and the first transmission rate is equal to a maximum allowed transmission rate.

If the utilised transmission rate is greater than a threshold, for instance 80% of the scheduled rate, and the scheduled rate is equal to the maximum transmission rate for the mobile terminal all rate requests from the mobile terminal is ignored. That is, no new grant messages are sent to the mobile terminal. This conserves the limited capacity on the grant channels, such as the Enhanced Absolute Grant CHannel (E-AGCH).

According to one variant of an aspect of the invention a new grant, repeating the first transmission rate, is repeatedly sent with a specified time interval, when receiving repeated rate request messages from the mobile terminal.

If the utilised transmission rate is below the first fraction, for instance 80%, of the scheduled rate, the first transmission rate may be repeated in new grant messages with a time interval. Rate requests received from the mobile terminal during these time intervals are ignored, thus conserving grant channel capacity. The time intervals may be of a specific time length such as between 0.01 and 10 seconds, preferably between 0.2 and 5 seconds and more preferably between 0.5 and 2 seconds. Alternatively a new grant message repeating the transmission rate may be sent for every N:th rate request received, where N is an integer larger than 1, for instance between 1 and 1000, preferably between 20 and 500, and more preferably between 50 and 200 The selected number may of course depend on the TTI used, as well as many other parameters.

According to one variant of an aspect of the invention the first specified fraction is between 0.01 and 0.99, more preferably between 0.75 and 0.85 and most preferably 0.8.

According to one variant of an aspect of the invention the specified time interval is between 0.1 and 10 seconds, preferably between 0.5 and 5 seconds and more preferably approximately 1 second.

According to one variant of an aspect of the invention a flag is set indicating that said mobile terminal has had a reduction of scheduled transmission rate by the serving RBS due to non utilisation of previous scheduled rate. A new grant is sent with a limited increased scheduled rate only when said measured transmission rate is greater than a third fraction of the scheduled rate assigned by the serving RBS.

Mobile terminals which has been rate reduced by a non-serving node is discovered at the serving node by measurement, or estimation of the utilised transmission rate, as has been described above, and the serving node may send a new reduced rate to conserve resources. These terminals thus experience capacity limitations, which the serving node has no direct knowledge about, since the limitations are due to circumstances prevailing in a non-serving node. However, the circumstances in the non-serving node may of course change.

If the utilised transmission rate is above the third fraction of the rate currently scheduled by the serving cell, that is the reduced rate, for instance between 0.1% and 99%, preferably between 60% and 90% and more preferably above 80%, it can be assumed that the circumstances have changed, and new higher transmission rates may be allowable, even for the non-serving node. By only assigning limited rate increases to the mobile terminal, and monitoring that the terminal utilises the new increased rates, a smooth and gentle increase acceptable to the non-serving node can be achieved.

According to one variant of an aspect of the invention the radio telecommunications network is a WCDMA network, the radio base station is a Node B, the mobile terminal is a User Equipment, and the uplink packet data channel is a HSUPA channel.

Further characteristics of the invention and advantages thereof will be evident from the following detailed description of embodiments of the invention.

BRIEF DESCRIPTION OF THE DRAWINGS

The present invention will become more fully understood from the detailed description of embodiments of the present invention given herein below and the accompanying FIGS. 1 to 7, which are given by way of illustration only, and thus are not limitative of the present invention.

DETAILED DESCRIPTION

In the following description, for purposes of explanation and not limitation, specific details are set forth, such as particular techniques and applications in order to provide a thorough understanding of the present invention. However, it will be apparent to one skilled in the art that the present invention may be practiced in other embodiments that depart from these specific details. In other instances, detailed descriptions of well-known methods and apparatuses are omitted so as not to obscure the description of the present invention with unnecessary details.

Figure 1:
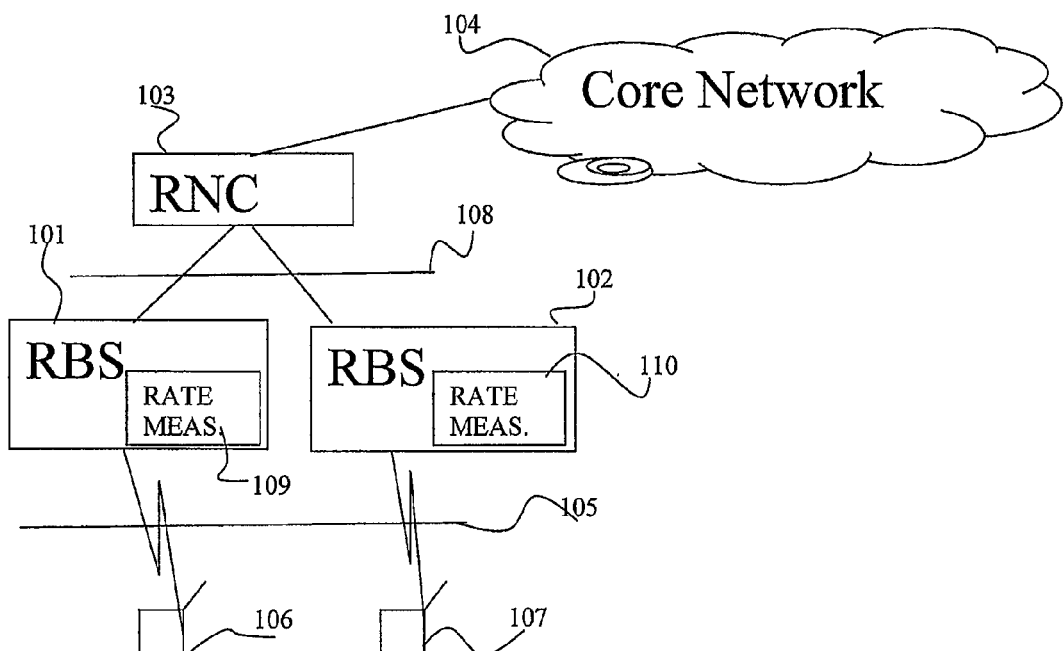
FIG. 1 is a schematic block diagram of a network comprising network nodes according to one variant of the present invention.

FIG. 1 is a schematic block diagram showing two radio base stations (RBS) 101 and 102 connected to a radio network controller (RNC) 103. The RNC is further connected to a core network 104, which may comprise a number of different network nodes, as is known by the man skilled in the art. The RNC 103 and the two RBSs 101 and 102 together forms a radio access network (RAN). A general RAN may of course comprise several more RBS and RNC nodes.

The RBSs supports an air interface 105 between the RBS and user equipment 106 and 107. The air interface 105 is denoted the Uu interface in wideband code division multiple access (WCDMA) applications. The interface 108 between the RBS and the RNC is denoted the Iub interface in WCDMA applications.

The first and second RBS 101 and 102 comprises respective rate measurement means 109 and 110. The respective rate measurement means 109 and 110 are used to estimate the utilized transmission rate in a packet data transmission channel from respective mobile terminal 106 and 107 to the respective RBS 101 and 102. The transmission is preferably according enhanced high speed uplink access (HSUPA) in WCDMA release 6, and the channel would then be an enhanced dedicated channel (E-DCH).

The RBS assigns transmission rates to mobile terminals, or user equipment (UE), in cells associated with the RBS by sending absolute and relative grants using respective enhanced absolute grant channel (E-AGCH) and enhanced relative grant channel (E-RGCH). Thus, a scheduled transmission rate is sent to the UE, which the UE should adhere to.

The UE sends rate request messages to the RBS to thereby receive increased rate, the UE may also set a so-called "happy-bit" in messages sent to the RBS indicating if the UE is satisfied with the current rate or if the UE require a higher transmission rate.

Figure 2:
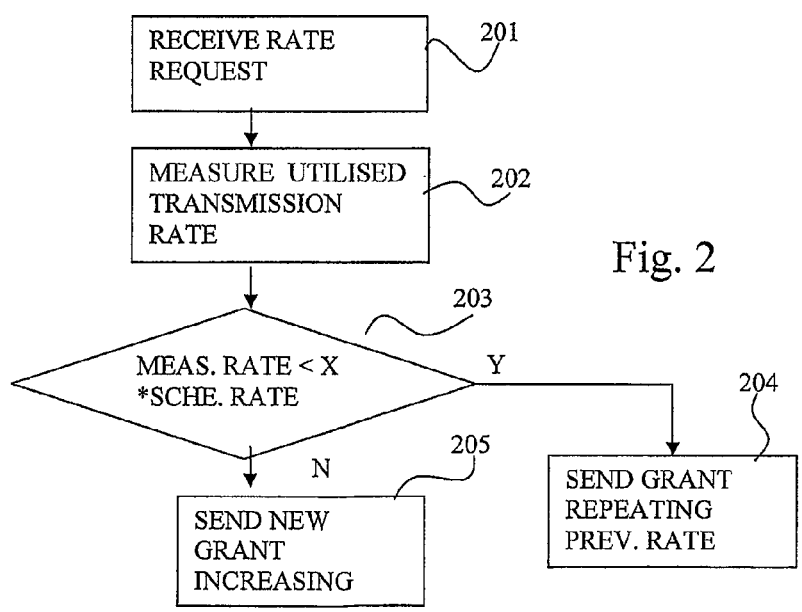
FIG. 2 is a schematic flow diagram according to one variant of the present invention.

FIG. 2 is a schematic flow diagram according to one variant of the invention. A rate request is received 201 from a UE 106 in the RBS 101, requesting higher transmission rate. Alternatively the UE 106 may have indicated through the "happy-bit" that the UE 106 require higher transmission rate. The RBS measure the utilized transmission rate 202.

Alternatively the measurement may be performed continuously for all E-DCH users and measurement results updated in a table or database. The step of measuring the utilized transmission rate would then be simply to look-up the current estimate of the utilized transmission rate in a table or database relating the utilized transmission rate to respective E-DCH users, that is, UE.

The measurement of the utilized transmission rate may preferably be performed by reading the E-TFCI part in messages received from the UE and average over several TTIs.

A check 203 is performed to verify if the measured utilized transmission rate is less than a fraction x, where x is less than 1, such as 80%, of the scheduled rate that the RBS 101 has assigned to the UE 106. If this is true, the RBS 101 sends 204 a new absolute or relative grant to the UE 106 repeating the previously scheduled rate.

However, if the utilized transmission rate is above the fraction x the RBS 101 sends 205 a new grant to the UE 106 assigning a new higher scheduled rate, given, of course, that all other requirements are fulfilled, such as that enough free resources are available.

Figure 3:
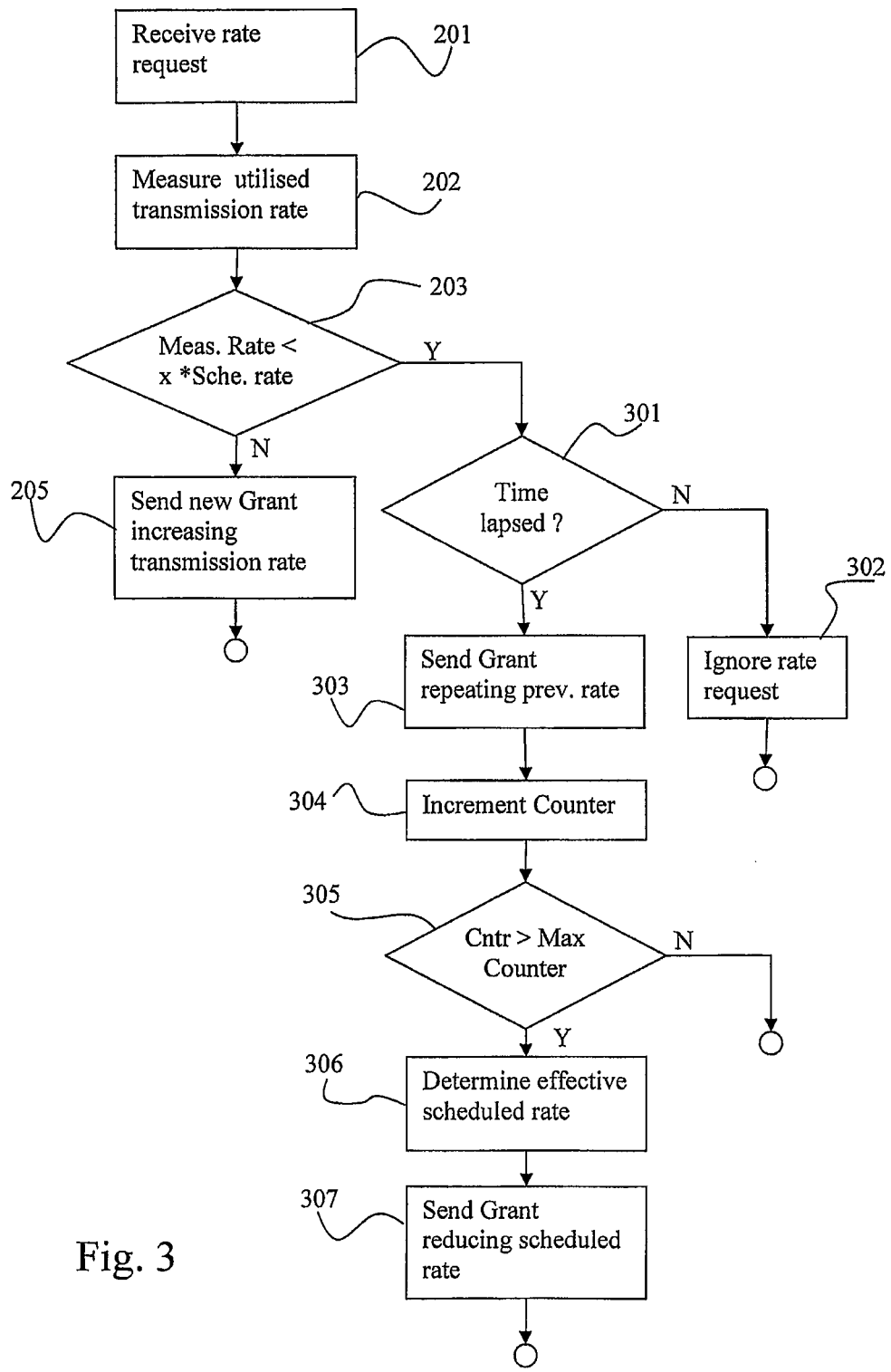
FIG. 3 is a schematic flow diagram according to another variant of the present invention.

FIG. 3 is a schematic flow diagram according to another variant of the present invention. Steps being same as in the variant of the present invention described in connection with FIG. 2 are denoted with the same reference numerals and will not be further elaborated here.

If the check performed in step 203, that is, if the measured utilized transmission rate is less than a fraction of the scheduled rate a further check 301 is performed to verify if a specified time has lapsed since the last grant message repeating the previous scheduled rate was sent. If this is not the case the rate request is ignored 302. By ignoring the rate request, valuable capacity is saved on the grant channels and the air interface.

If a configurable time has passed a new grant message is sent repeating the previous scheduled rate 303, a counter is incremented and the timer is reset 304. If the counter is greater than a configurable MAX COUNT 305 the effective scheduled transmission rate is determined 306 using the measurement of the utilized transmission rate determined in step 202, and a new grant is sent 307 to the UE 106 reducing the scheduled rate to the effective scheduled rate, thereby conserving resources in the RBS 101.

Figure 4:
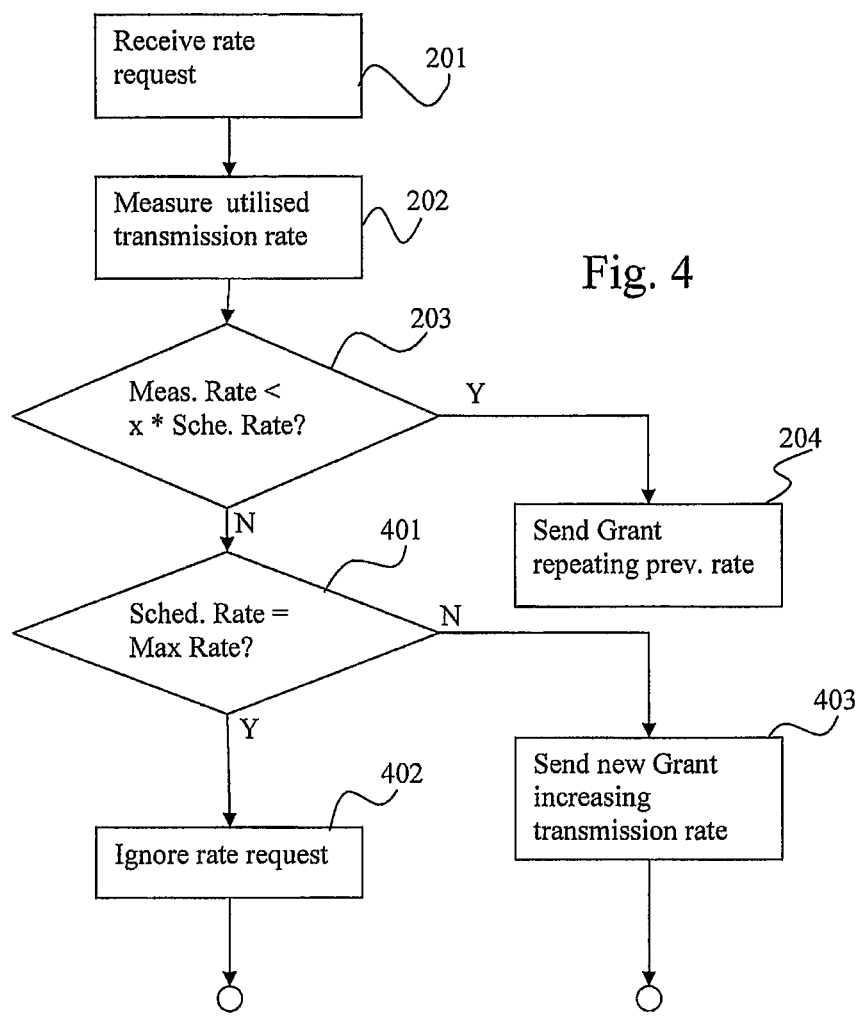
FIG. 4 is a schematic flow diagram according to one variant of the present invention.

FIG. 4 is a schematic flow diagram according to another variant of the present invention. Steps being same as in the variant of the present invention described in connection with FIG. 2 are denoted with the same reference numerals and will not be further elaborated here.

In the present variant of the present invention a check 401 is performed to verify if the scheduled rate is equal to the maximum rate allowable for the present UE, if the measured rate is greater than a fraction x of the scheduled rate, as is checked in step 203. If this is the case the rate request is ignored 402, thus saving valuable grant channel capacity as well as air interface capacity.

If the scheduled rate is not equal to the maximum rate a new grant is sent 403 to the UE increasing the scheduled transmission rate.

Figure 5:
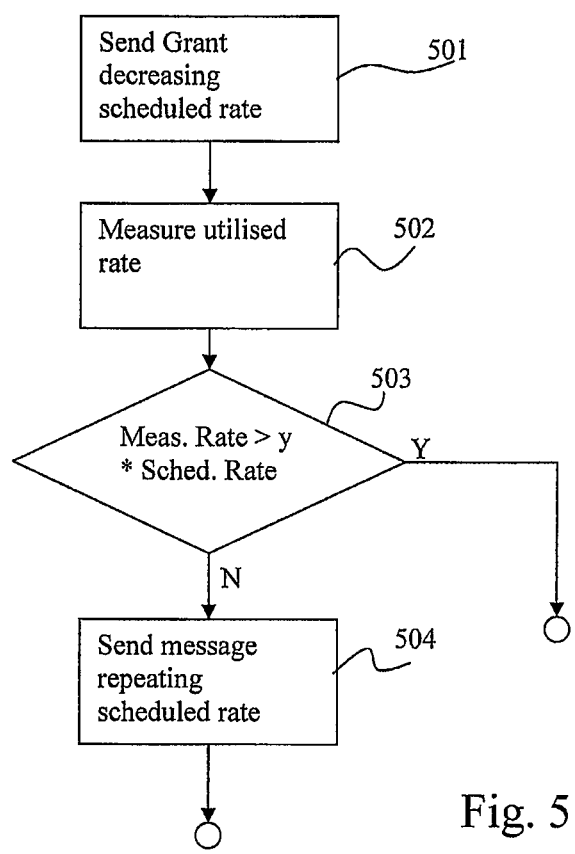
FIG. 5 is a schematic flow diagram according to another variant of the present invention.

FIG. 5 is a schematic flow diagram illustrating a variant of the present invention. Whenever a new grant is sent 501 to a UE the utilized transmission rate is measured 502.

Alternatively the measurement may be performed continuously for all E-DCH users and measurement results updated in a table or database. The step of measuring the utilized transmission rate would then simply be to look-up the current estimate of the utilized transmission rate in a table or database relating the utilized transmission rate to respective E-DCH users, that is, UE.

The measurement of the utilized transmission rate may preferably be performed by reading the E-TFCI part in messages received from the UE and average over several TTIs.

A check 503 is performed to verify if the measured transmission rate is greater than a fraction y of the scheduled rate. The fraction being greater than 1, for instance 1.1. If this is the case a new grant message is sent to the UE repeating the reduced scheduled rate, since it is assumed that the UE did not receive the earlier grant message.

Figure 6:
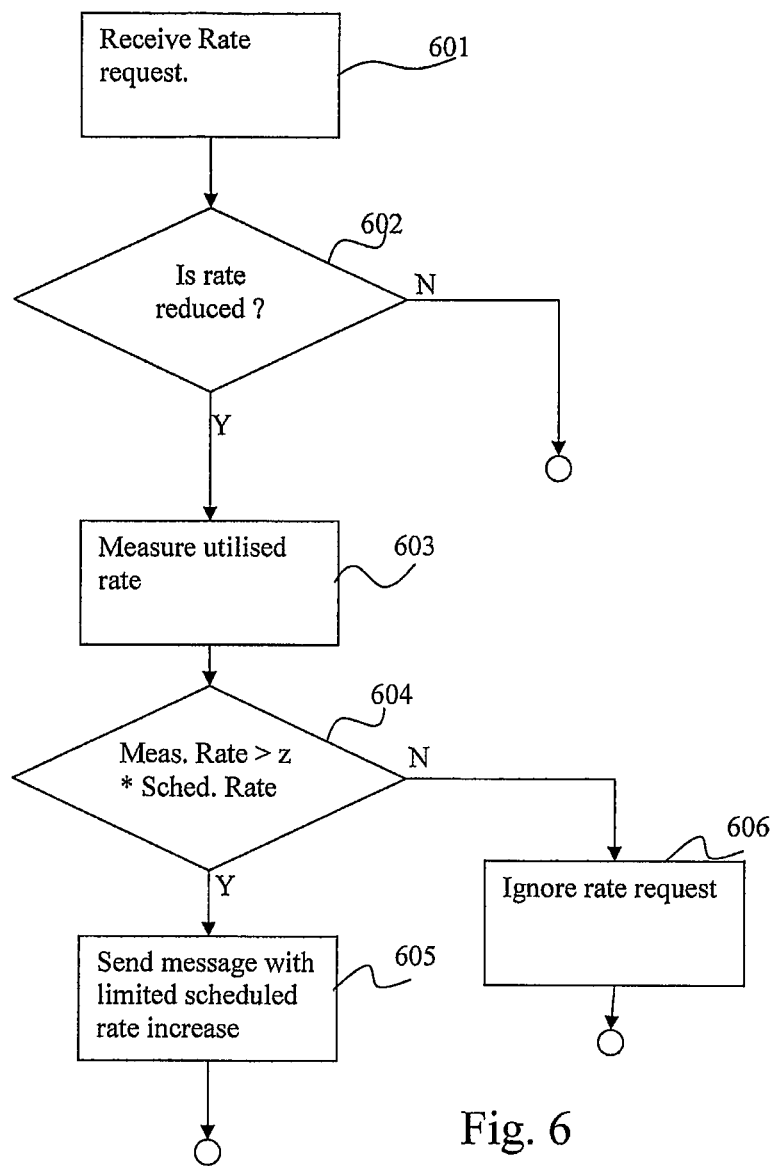
FIG. 6 is a schematic flow diagram according to one variant of the present invention.

FIG. 6 is a schematic flow diagram according to one variant of the present invention. In the present variant of the present invention a flag is kept indicating if a user equipment has had its scheduled rate reduced by the serving cell. This flag may for instance be set at step 307 in FIG. 3.

In a step 601 a rate request is received from the UE. A check 602 is performed to verify if the present UE has had its scheduled rate reduced. This is preferably performed by checking the previously mentioned flag. If the UE has not had its scheduled rate reduced the processing proceeds normally as has been described earlier. If the UE has had it scheduled rate reduced, the utilized rate is estimated in a step 603.

If the measured rate is above a fraction z, for instance between 0.1% and 99%, preferably between 60% and 90% and more preferably between 80% and 85% of the currently scheduled rate, that is the reduced rate scheduled by the serving node, it can be assumed that the non-serving node, previously limiting the UE, is not limiting the UE at the present lower scheduled rate. However, since the UE has been limited previously, as was indicated by the flag, by a non-serving node, the scheduled rate is only increased by a limited amount, step 605. If the measured rate is not above the fraction z of the scheduled rate the rate request is ignored 606.

By slowly increasing the scheduled rate for a UE previously limited a smooth and gently increase without oscillating effects can be achieved.

Figure 7:
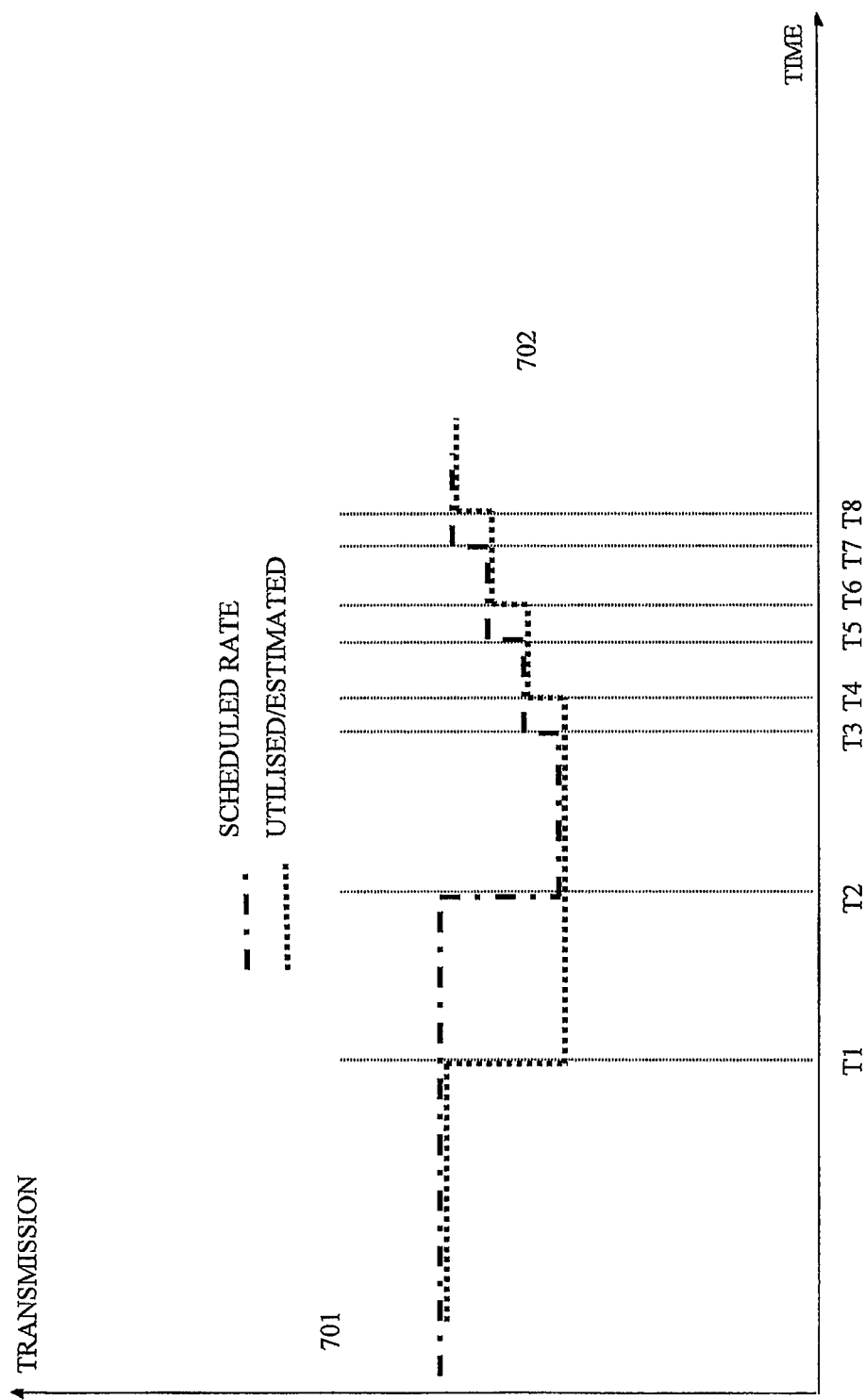
FIG. 7 is a schematic diagram illustrating scheduled and utilised transmission rate for a user equipment.

FIG. 7 is an exemplary diagram of the scheduled transmission rate as well as the utilized/estimated transmission rate for a UE. The scheduled rate is illustrated with a dash-dot line 701 and the utilized/estimated rate is illustrated by a dotted line 702. The time is on the x-axis and the rate is on the y-axis.

Before a certain time t1, illustrated by the vertical dotted line, the UE is allocated a scheduled rate R1, and as is shown, is more or less utilizing this scheduled rate. However, at time t1 the utilized rate drops. Assuming that the UE needs the higher rate, the UE will send rate requests and set the unhappy bit, as is known to the skilled man, to receive an increased rate. In this example, however, although unknown to the serving node, the rate is limited by a non-serving node.

The serving node acts as has been previously disclosed in this description, that is trying to repeat the scheduled rate for a number of times. At time t2 the serving node draws the conclusion that the UE is limited by a non-serving node and adapts the scheduled rate as has been disclosed previously.

The UE, still unhappy with the present situation, continues to send rate requests. At time t3 the serving node, noticing that the UE is utilizing most of its scheduled rate sends a new increased scheduled rate, however with a limited increase. A short time thereafter, t4 the UE utilizes this increased rate. Since the UE is still unhappy and continues to send rate requests, the process repeats at times t5 and t7.

It will be obvious that the invention may be varied in a plurality of ways. Such variations are not to be regarded as a departure from the scope of the invention. All such modifications as would be obvious to one skilled in the art are intended to be included within the scope of the appended claims.

The invention claimed is:

1. A method for assigning transmission rates, for an uplink packet data channel, to a mobile terminal in a radio telecommunications network comprising a radio base station, comprising the steps of:
said radio base station receiving at least a first rate request from said mobile terminal,
said radio base station sending at least a first grant message to said mobile terminal assigning a first transmission rate for uplink packet data transmission,
said radio base station receiving at least a second rate request from said mobile terminal, said radio base station measuring a utilized transmission rate for said packet data transmission from said mobile terminal to said radio base station, said radio base station determining whether a condition exists, wherein the step of determining whether the condition exists comprises determining whether said measured transmission rate is lower than a first specified fraction of said assigned first transmission rate, and said radio base station sending to said mobile terminal a new grant message repeating said first transmission rate in response to determining that the condition exists, wherein said new grant message is sent to said mobile terminal without first receiving a rate request from said mobile terminal.

2. The method according to claim 1, further comprising:
said radio base station determining an effective scheduled rate based on said measuring,
said radio base station determining the number of grant messages repeating the first transmission rate that have been sent since the occurrence of a certain event,
said radio base station determining whether the determined number exceeds a threshold, and
said radio base station sending to said mobile terminal a new grant message assigning said effective scheduled rate for uplink packet data transmission in response to determining that the determined number exceeds the threshold.

3. The method according to claim 1, further comprising:
said radio base station sending to said mobile terminal a new grant message repeating said first transmission rate, if said measured transmission rate is greater than a second specified fraction of said assigned first transmission rate, wherein said second specified fraction is larger than said first specified fraction.

4. The method according to claim 3, wherein said second specified fraction is larger than 1.

5. The method according to claim 1, further comprising:
said radio base station ignoring a rate request message from said mobile terminal if said utilized transmission rate is greater than said first fraction of said transmission rate and said first transmission rate is equal to a maximum allowed transmission rate.

6. The method according to claim 1, further comprising:
repeating said step of sending a new grant repeating said first transmission rate with a specified time interval when receiving repeated rate request messages from said mobile terminal.

7. The method according to claim 6, wherein said specified time interval is between 0.1 and 10 seconds.

8. The method according to claim 1, wherein said first specified fraction is between 0.01 and 0.99.

9. The method according to claim 1, further comprising:
setting a flag indicating that said mobile terminal has had a reduction of scheduled transmission rate due to non-utilization of previous scheduled rate, and
sending a new grant with a limited increased scheduled rate only when said measured transmission rate is greater than a third fraction of the currently assigned scheduled rate.

10. The method according to claim 1, wherein
said radio telecommunications network is a WCDMA network, said radio base station is a Node B, said mobile terminal is a User Equipment, and said uplink packet data channel is a HSUPA channel.

11. The method of claim 1, further comprising:
in response to receiving at the radio base station the second rate request transmitted from said mobile terminal, determining whether the transmission rate of said mobile terminal should be increased; and in response to determining that the transmission rate of said mobile terminal should be increased, transmitting to said mobile terminal a grant for increasing the transmission rate of said mobile terminal, wherein the step of determining whether to the transmission rate of said mobile terminal should be increased comprises comparing a value representing a measured transmission rate of the mobile terminal with a first threshold value, said first threshold value being greater than zero.

12. The method of claim 11, wherein the threshold value is equal to the first specified fraction of said assigned first transmission rate.

13. The method of claim 11, wherein the step of determining whether to the transmission rate of said mobile terminal should be increased further comprises comparing the value representing the measured transmission rate of the mobile terminal with a second threshold value, the second threshold value being greater than the first threshold value.

14. The method of claim 13, wherein the second threshold value represents a maximum transmission rate.

15. The method of claim 13, further comprising ignoring the second rate request in response to determining that the transmission rate of said mobile terminal should not be increased.

16. The method according to claim 1, further comprising:
said radio base station determining the number of grant messages repeating the first transmission rate that have been sent since the occurrence of a certain event,
said radio base station determining whether the determined number exceeds a threshold, and
said radio base station sending to said mobile terminal a new grant message in response to determining that the determined number exceeds the threshold.

17. A radio base station in a radio communications network for providing a radio interface between said radio base station and a mobile terminal, said radio base station being further provided to assign transmission rates to said mobile terminal to be used in an uplink packet data channel from said mobile terminal to said radio base station, comprising:
a receiver provided to receive at least a first rate request from said mobile terminal requesting increased transmission rate,
a measurement device provided to measure a utilized transmission rate for said packet data transmission from said mobile terminal to said radio base station, and
a message transmitter provided to send a new grant message to said mobile terminal repeating said first transmission rate, if said measured transmission rate is lower than a first specified fraction of said assigned first transmission rate,
wherein said new grant message is sent to said mobile terminal without first receiving a rate request from said mobile terminal.

18. The radio base station according to claim 17, further comprising:
a rate determining device configured to determine an effective scheduled rate based on said measuring, wherein
said message transmitter is provided to send a new grant message to said mobile terminal assigning said effective scheduled rate for uplink packet data transmission when said first transmission rate has been repeated a specified number of times.

19. The radio base station according to claim 17, wherein:
said message transmitter is provided to send a new grant message to said mobile terminal repeating said first transmission rate, if said measured transmission rate is greater than a second specified fraction of said assigned first transmission rate, wherein said second specified fraction is larger than said first specified fraction.

20. The radio base station according to claim 19, wherein said second specified fraction is larger than 1.

21. The radio base station according to claim 17, wherein said radio base station is provided to ignore a rate request message from said mobile terminal if said utilized transmission rate is greater than said first fraction of said transmission rate and said first transmission rate is equal to a maximum allowed transmission rate.

22. The radio base station according to claim 17, wherein said radio base station is provided to repeat sending a new grant, repeating said first transmission rate, with a specified time interval when receiving repeated rate request messages from said mobile terminal.

23. The radio base station according to claim 22, wherein said specified time interval is between 0.1 and 10 seconds.

24. The radio base station according to claim 17, wherein said first specified fraction is between 0.55 and 0.99.

25. The radio base station according to claim 17, comprising:
  a flag indicating that said mobile terminal has had a reduction of scheduled transmission rate due to non-utilization of previous scheduled rate, and
  said radio base station is provided to send a new grant with a limited increased scheduled rate only when said measured transmission rate is greater than said third fraction of the currently assigned scheduled rate.

26. The radio base station according to claim 17, wherein said radio telecommunications network is a WCDMA network, said radio base station is a Node B, said mobile terminal is a User Equipment, and said uplink packet data channel is a HSUPA channel.

27. A method for assigning transmission rates, for an uplink packet data channel, to a mobile terminal in a radio telecommunications network comprising a radio base station, comprising:
  said radio base station sending to said mobile terminal a grant message assigning a first transmission rate for uplink packet data transmission over said uplink packet data channel,
  said radio base station measuring a utilized transmission rate for said packet data transmission from said mobile terminal to said radio base station,
  said radio base station sending to said mobile terminal a new grant message repeating said first transmission rate if said utilized transmission rate is greater than said first transmission rate,
  wherein said new grant message is sent to said mobile terminal without first receiving a rate request from said mobile terminal.

28. A radio bastion in a radio telecommunications network for assigning transmission rates, for an uplink packet data channel, to a mobile terminal, the radio base station being adapted to:
  send to said mobile terminal a grant message assigning a first transmission rate for uplink packet data transmission over said uplink packet data channel;
  measure a utilized transmission rate for said packet data transmission from said mobile terminal to said radio base station;
  determine if said measured utilized transmission rate is greater than said first transmission rate; and
  send to said mobile terminal a new grant message repeating said first transmission rate if said utilized transmission rate is greater than said first transmission rate,
  wherein said new grant message is sent to said mobile terminal without first receiving a rate request from said mobile terminal.

* * * * *

UNITED STATES PATENT AND TRADEMARK OFFICE
CERTIFICATE OF CORRECTION

| | | |
|---|---|---|
| PATENT NO. | : 9,019,825 B2 | Page 1 of 1 |
| APPLICATION NO. | : 12/300513 | |
| DATED | : April 28, 2015 | |
| INVENTOR(S) | : Karlsson et al. | |

It is certified that error appears in the above-identified patent and that said Letters Patent is hereby corrected as shown below:

On the Title Page, Item (75), under "Inventors", in Column 1, Line 1, delete "Alta (SE);" and insert -- Älta (SE); --, therefor.

Claims

In Column 12, Line 18, in Claim 28, delete "bastion" and insert -- base station --, therefor.

Signed and Sealed this
Seventeenth Day of November, 2015

Michelle K. Lee
*Director of the United States Patent and Trademark Office*